United States Patent
Elomari et al.

(10) Patent No.: US 8,222,471 B2
(45) Date of Patent: *Jul. 17, 2012

(54) PROCESS FOR MAKING A HIGH VISCOSITY BASE OIL WITH AN IMPROVED VISCOSITY INDEX

(75) Inventors: Saleh Elomari, Fairfield, CA (US); Stephen J. Miller, San Francisco, CA (US); Sven Ivar Hommeltoft, Pleasant Hill, CA (US); Hye-Kyung C. Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/966,738

(22) Filed: Dec. 13, 2010

(65) Prior Publication Data
US 2012/0149953 A1    Jun. 14, 2012

(51) Int. Cl.
*C07C 2/22* (2006.01)
*C07C 2/08* (2006.01)

(52) U.S. Cl. ........ 585/520; 585/512; 585/513; 585/527; 585/530; 585/532

(58) Field of Classification Search .......... 585/510–520, 585/527, 530, 532
See application file for complete search history.

(56) References Cited

U.S. PATENT DOCUMENTS

| | | |
|---|---|---|
| 4,078,010 A | 3/1978 | Prillieux et al. |
| 4,814,540 A | 3/1989 | Watanabe et al. |
| 4,990,709 A | 2/1991 | Wu |
| 5,304,615 A | 4/1994 | Ambler et al. |
| 7,351,780 B2 | 4/2008 | Hope et al. |
| 7,576,252 B2 | 8/2009 | Elomari et al. |
| 7,615,598 B2 * | 11/2009 | Hope et al. ............. 526/217 |
| 2001/0016154 A1 | 8/2001 | Laakkonen et al. |
| 2004/0030075 A1 | 2/2004 | Hope et al. |

(Continued)

FOREIGN PATENT DOCUMENTS
EP    791643    8/1997

OTHER PUBLICATIONS

U.S. Appl. No. 12/824,854 filed to the USPTO office on Jun. 28, 2010.

(Continued)

*Primary Examiner* — Ellen McAvoy
(74) *Attorney, Agent, or Firm* — Susan M. Abernathy

(57) ABSTRACT

We provide a process, comprising oligomerizing one or more olefins having a boiling point less than 82° C. in a presence of an ionic liquid catalyst and one or more C5+ alpha olefins in a reactor to produce a base oil having a kinematic viscosity at 100° C. of 36 mm$^2$/s or higher and a VI greater than 55; and wherein the one or more olefins having the boiling point less than 82° C. comprise greater than 50 wt % of a total mixture of olefins fed to the reactor. We provide a process, comprising oligomerizing olefins having a low boiling point in a presence of an ionic liquid catalyst and a mixture of C5+ alpha olefins derived from waste plastic to produce a base oil having a kinematic viscosity at 40° C. greater than 1100 mm$^2$/s and a VI greater than 55. We also provide a base oil made by the process.

28 Claims, 2 Drawing Sheets

STATIC MIXER LOOP REACTOR

U.S. PATENT DOCUMENTS

| | | | |
|---|---|---|---|
| 2004/0267070 A1 | 12/2004 | Johnson et al. | |
| 2004/0267071 A1 | 12/2004 | Harris et al. | |
| 2005/0119423 A1 | 6/2005 | Bergman et al. | |
| 2006/0020088 A1 | 1/2006 | Hope et al. | |
| 2006/0149107 A1 | 7/2006 | Harris et al. | |
| 2006/0247482 A1 | 11/2006 | Hope et al. | |
| 2007/0142684 A1 | 6/2007 | Elomari et al. | |
| 2007/0142685 A1 | 6/2007 | Elomari et al. | |
| 2008/0293899 A1* | 11/2008 | McConville et al. | 526/170 |
| 2009/0050521 A1 | 2/2009 | Elomari et al. | |
| 2009/0156874 A1 | 6/2009 | Patil et al. | |
| 2009/0181872 A1 | 7/2009 | Yamada | |
| 2009/0270666 A1 | 10/2009 | Elomari et al. | |
| 2009/0306444 A1 | 12/2009 | Elomari et al. | |
| 2010/0204531 A1 | 8/2010 | Elomari et al. | |
| 2010/0234208 A1 | 9/2010 | Harris et al. | |

OTHER PUBLICATIONS

U.S. Appl. No. 12/538,738 filed to the USPTO office on Aug. 10, 2009.

U.S. Appl. No. 12/538,746 filed to the USPTO office on Aug. 10, 2009.

U.S. Appl. No. 12/538,752 filed to the USPTO office on Aug. 10, 2009.

U.S. Appl. No. 12/824,978 filed to the USPTO office on Jun. 28, 2010.

SpectraSyn Ultra The Ultra Performance PAO, ExxonMobile Chemical.

PCT/US2011/044804 Filing date Jul. 21, 2011, International Search Report, 9 pages.

* cited by examiner

STATIC MIXER LOOP REACTOR

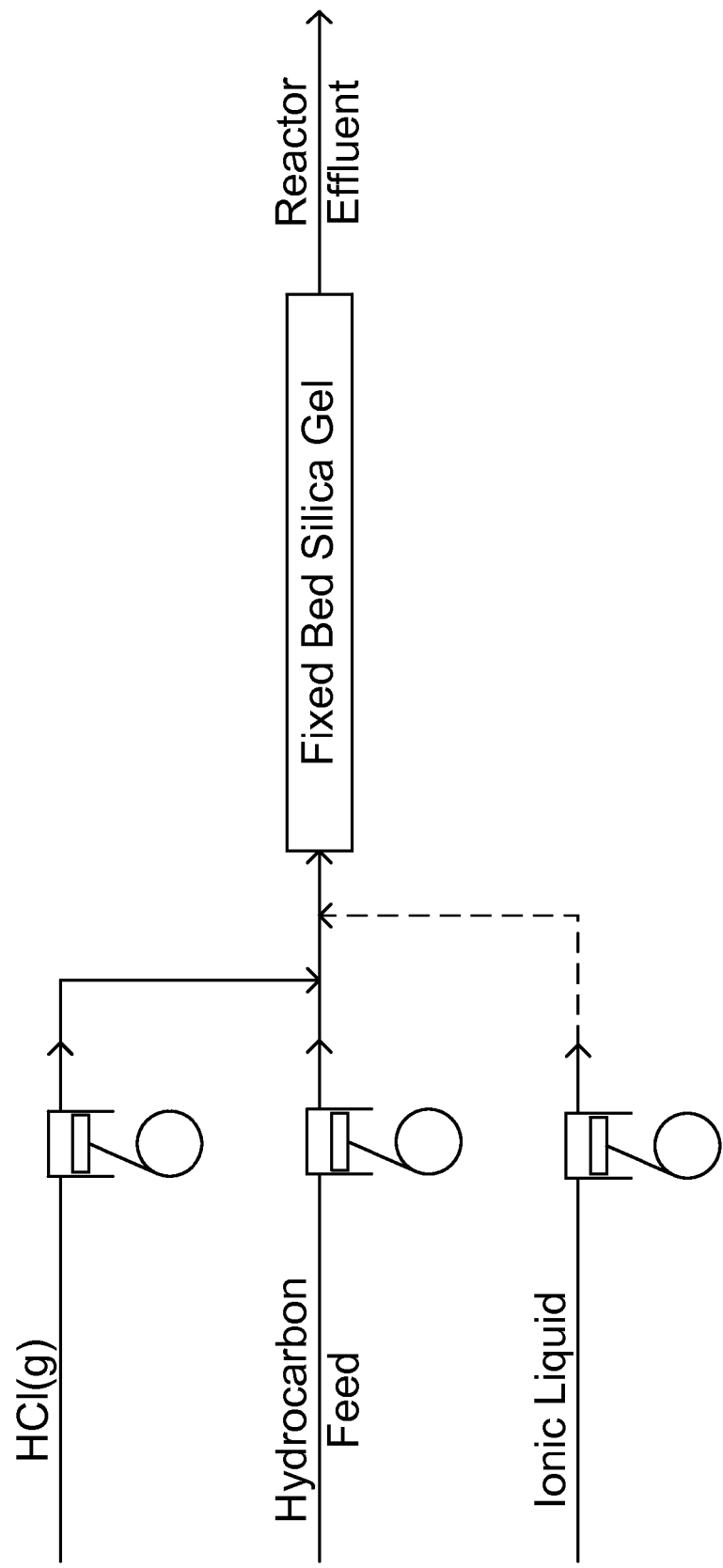

PROCESS FOR MAKING A HIGH VISCOSITY BASE OIL WITH AN IMPROVED VISCOSITY INDEX

This application is related to a co-filed patent application, titled "PROCESS TO MAKE BASE OIL BY OLIGOMERIZING LOW BOILING OLEFINS", herein incorporated in its entirety.

TECHNICAL FIELD

This application is directed to processes for making a base oil with an increased viscosity index (VI) by oligomerizing one or more low boiling olefins in the presence of one or more C5+ alpha olefins. This application is also directed to a base oil composition.

SUMMARY

This application provides a process for producing base oil, comprising oligomerizing one or more olefins having a boiling point less than 82° C. (180° F.) in a presence of an ionic liquid catalyst and one or more C5+ alpha olefins in a reactor to produce a base oil having a kinematic viscosity at 100° C. of 36 mm$^2$/s or higher and a viscosity index (VI) greater than 55; and wherein the one or more olefins having the boiling point less than 82° C. (180° F.) comprise greater than 50 wt % of a total mixture of olefins fed to the reactor.

This application also provides a process to make base oil, comprising oligomerizing one or more olefins having a boiling point less than 82° C. (180° F.) in a presence of an ionic liquid catalyst and a mixture of C5+ alpha olefins derived from waste plastic to produce a base oil having a kinematic viscosity at 40° C. greater than 1100 mm$^2$/s and a viscosity index (VI) greater than 55.

This application also provides a base oil, comprising one or more oligomers of a mixture of olefins, wherein the mixture of olefins comprises propylene and one or more C5+ olefins derived from waste plastic; and wherein the base oil has a kinematic viscosity at 40° C. greater than 1100 mm$^2$/s, and a viscosity index (VI) of at least 70.

BRIEF DESCRIPTION OF THE DRAWINGS

FIG. 2 is a diagram of one embodiment of a fixed bed contactor reactor.

DETAILED DESCRIPTION

Figure 1:
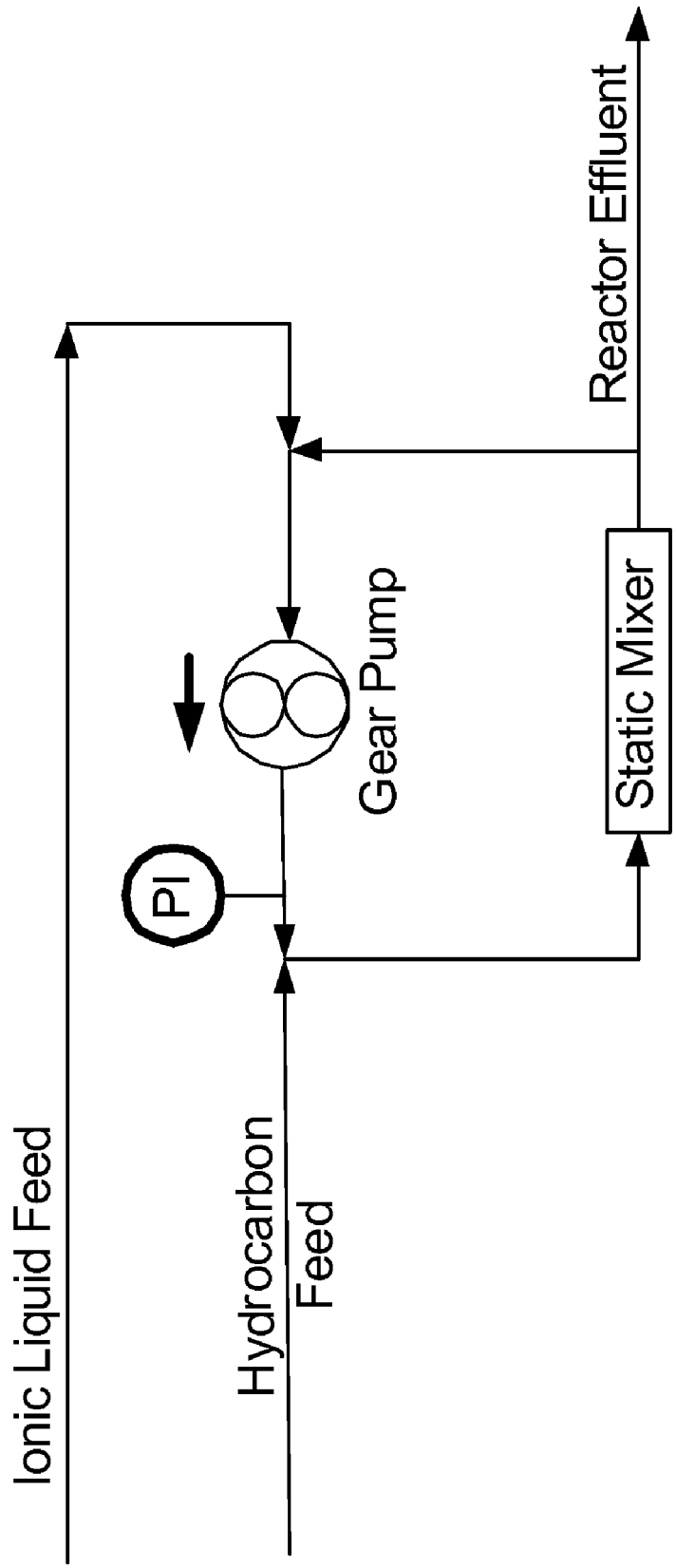
FIG. 1 is a diagram of one embodiment of a static mixer loop reactor.

A base oil is an oil to which other oils or substances can be added to produce a finished lubricant.

Several different olefins have a boiling point less than 82° C. (180° F.). Some specific examples are shown below.

| Compound (Synonym) | Boiling Point, ° C. | Compound (Synonym) | Boiling Point, ° C. |
|---|---|---|---|
| ethylene | −103.7 | cis-2-butene | 3.7 |
| propene (propylene) | −47.6 | 2-methylpropene | −6.6 |
| 1-butene | −6.1 | 1-pentene | 30 |
| trans-2-butene | 0.9 | 3-methylcyclobutene | 32 |
| 2-methyl-1-butene | 31 | trans-2-pentene | 36 |
| cis-2-pentene | 37 | 1-methylcyclobutene | 37 |
| 2-methyl-2-butene | 39 | cyclopentene | 44 |
| 3,3-dimethyl-1-butene | 41 | 3-methyl-1-pentene | 54 |
| 4-methyl-1-pentene | 54 | 2,3-dimethyl-1-butene | 56 |
| 4-methyl-trans-2-pentene | 59 | 4-methyl-cis-2-pentene | 56 |
| 2-methyl-1-pentene | 61 | 1-hexene | 63 |
| 2-ethyl-1-butene | 64 | cis-3-hexene | 66 |
| 3-methylcyclopentene | 65 | 2-methyl-2-pentene | 67 |
| trans-3-hexene | 67 | trans-2-hexene | 68 |
| 3-methyl-trans-2-pentene | 68 | 4,4,-dimethyl-1-pentene | 72 |
| cis-2-hexene | 69 | 1-methylcyclopentene | 76 |
| 3-methyl-cis-2-pentene | 70 | 3,3-dimethyl-1-pentene | 78 |
| 2,3-dimethyl-2-butene | 73 | 4,4-dimethyl-cis-2-pentene | 80 |
| 4,4-diemthyl-trans-2-pentene | 77 | 3,4-dimethyl-1-pentene | 81 |
| 2,3,3-trimethyl-1-butene | 79 | | |

In one embodiment, the one or more olefins having a boiling point less than 82° C. (180° F.) comprise predominantly or entirely alpha olefins. In one embodiment, the one or more olefins comprise a propylene, a butene (e.g., 1-butene), or a mixture thereof. In another embodiment, the one or more olefins have a boiling point less than 65° C., less than 50° C., less than 40° C., less than 30° C., less than 20° C., less than 10° C., or less than 0° C. Sources of propylene are described, for example, in U.S. patent application Ser. No. 12/538,738, filed on Aug. 10, 2009.

Ionic liquid catalyst is composed of at least two components which form a complex. The ionic liquid catalyst comprises a first component and a second component. The first component of the ionic liquid catalyst can comprise a Lewis Acid. The Lewis acid can be a metal halide compound selected from components such as Lewis Acidic compounds of Group 13 metals, including aluminum halides, alkyl aluminum halide, gallium halide, and alkyl gallium halide. Other Lewis Acidic compounds, such as Group 3, 4, and 5 metal halides, in addition to those of Group 13 metals, can also be used. Other specific examples include $ZrCl_4$, $HfCl_4$, $NbCl_5$, $TaCl_5$, $ScCl_3$, $YCl_3$, and mixtures thereof. The periodic table by the International Union of Pure and Applied Chemistry (IUPAC), version date 22 Jun. 2007, is used for defining the Groups 3, 4, 5, and 13 metals. In one embodiment the first component is aluminum halide or alkyl aluminum halide. For example, aluminum trichloride can be the first component of the acidic ionic liquid.

The second component making up the ionic liquid catalyst is an organic salt or mixture of salts. These salts can be characterized by the general formula Q+A−, wherein Q+ is an ammonium, phosphonium, boronium, iodonium, or sulfonium cation and A− is a negatively charged ion such as Cl−, Br−, $ClO_4^-$, $NO_3^-$, $BF_4^-$, $BCl_4^-$, $PF_6^-$, $SbF_6^-$, $AlCl_4^-$, $TaF_6^-$, $CuCl_2^-$, $FeCl_3^-$, $HSO_3^-$, $RSO_3^-$, $SO_3CF_3^-$, alkyl-aryl sulfonate, and benzene sulfonate (e.g., 3-sulfurtrioxyphenyl). In one embodiment the second component is selected from those having quaternary ammonium halides containing one or more alkyl moieties having from about 1 to about 12 carbon atoms, such as, for example, trimethylamine hydrochloride, methyltributylammonium halide, or substituted heterocyclic ammonium halide compounds, such as hydrocarbyl substituted pyridinium halide compounds for example 1-butylpyridinium halide, benzylpyridinium halide, or hydrocarbyl substituted imidazolium halides, such as, for example, 1-ethyl-3-methyl-imidazolium chloride.

In one embodiment the ionic liquid catalyst is selected from the group consisting of hydrocarbyl substituted pyridinium chloroaluminate, hydrocarbyl substituted imidazolium chloroaluminate, quaternary amine chloroaluminate, trialkyl amine hydrogen chloride chloroaluminate, alkyl pyridine hydrogen chloride chloroaluminate, and mixtures thereof. For example, the ionic liquid catalyst can be an acidic haloaluminate ionic liquid, such as an alkyl substituted pyridinium chloroaluminate or an alkyl substituted imidazolium chloroaluminate of the general formulas A and B, respectively.

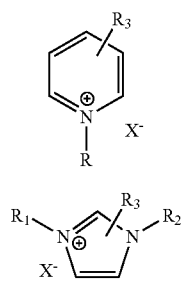

In the formulas A and B; R, $R_1$, $R_2$, and $R_3$ are H, methyl, ethyl, propyl, butyl, pentyl or hexyl group, X is a chloroaluminate. In one embodiment the X is $AlCl_4^-$ or $Al_2Cl_7^-$. In the formulas A and B, R, $R_1$, $R_2$, and $R_3$ may or may not be the same. In one embodiment the ionic liquid catalyst is N-butylpyridinium chloroaluminate.

In one embodiment ionic liquid catalyst comprises a cation selected from the group of an alkyl-pyridinium, an alkyl-imidazolium, or a mixture thereof. In another embodiment the ionic liquid catalyst can have the general formula RR'R" $NH^+Al_2Cl_7^-$, wherein N is a nitrogen containing group, and wherein RR' and R" are alkyl groups containing 1 to 12 carbons, and where RR' and R" may or may not be the same.

The presence of the first component can give the ionic liquid catalyst a Franklin or Lewis acidic character. In one embodiment the ionic liquid catalyst includes strongly Lewis acidic anions, such as $Al_2Cl_7^-$. $Al_2Cl_7^-$, for example, is a strongly Lewis acidic anion, while $AlCl_4^-$ is not. In one embodiment, the greater the mole ratio of the first component to the second component, the greater is the acidity of the ionic liquid catalyst.

Other examples of compounds which can be used as the ionic liquid catalyst include, 1-Butyl-3-methylimidazolium hexafluorophosphate [bmim+][PF6−], Trihexyl(tetradecyl) phosphonium chloride [thtdPh+][Cl−], commercially available as CYPHOS IL 101™ (Hydrocarbon soluble (hexane, toluene) Tg—56° C.), and 1-Ethyl-3-methylimidazolium tetrachloroaluminate [emim+][AlCl4−]. An ionic liquid that can be used as the second component in the ionic liquid catalyst includes Trihexyl(tetradecyl)phosphonium chloride [thtdPh][Cl−].

In one embodiment, a co-catalyst or promoter is added to the ionic liquid catalyst. Examples of co-catalysts or promoters are halide containing additives, such as alkyl halides or hydrogen halides. Other co-catalysts or promoters are Brønsted acids. A promoter is a substance that will accelerate the effect of a catalyst on a reaction. A Brønsted acid is any substance that can donate an H+ ion to a base. Brønsted acids are H+-ion or proton donors. Examples of Brønsted acids are HCl, HBr, HI, HF, sulfuric acid, $+NH_4$, $CH_3CO_2H$, and mixtures thereof.

The test methods used for boiling range distributions, initial boiling points, and upper boiling points of the one or more olefins and the base oil in this disclosure are ASTM D 2887-06a and ASTM D 6352-04. The test method is referred to herein as "SIMDIST". The boiling range distribution determination by distillation is simulated by the use of gas chromatography. The boiling range distributions obtained by this test method are essentially equivalent to those obtained by true boiling point (TBP) distillation (see ASTM Test Method D 2892). They are not necessarily equivalent to results from low efficiency distillations such as those obtained with ASTM Test Methods D 86 or D 1160.

The base oil produced by the process has a high kinematic viscosity. In one embodiment the kinematic viscosity at 100° C. is 20 mm²/s or higher or 36 mm²/s or higher, such as greater than 40 mm²/s, 45 mm²/s or higher, 50 mm²/s or higher, 55 mm²/s or higher, 60 mm²/s or higher, or 65 mm²/s or higher. In some embodiments, the base oil produced by the process also has a high kinematic viscosity at 40° C. The high kinematic viscosity at 40° C. can be generally greater than 200 mm²/s at 40° C., and in certain embodiments is 300 mm²/s or higher. In some embodiments the base oil has a kinematic viscosity at 40° C. of 400 mm²/s or higher, 500 mm²/s or higher, 600 mm²/s or higher, 700 mm²/s or higher, 800 mm²/s or higher, or even greater than 1100 mm²/s. In one embodiment, the base oil has a kinematic viscosity at 40° C. of greater than 1100 mm²/s, 1200 mm²/s or higher, greater than 1500 mm²/s, or greater than 1600 mm²/s. In one embodiment the base oil has a kinematic viscosity at 40° C. from greater than 1100 mm²/s to less than 5000 mm²/s. The test method for determining kinematic viscosity at either 40° C. or 100° C. is ASTM D 445-09.

The VI of the base oil is greater than 55, greater than 60, at least 70, at least 80, or at least 90. In one embodiment the VI is less than 140, less than 120, or less than 100. The test method for determining VI is ASTM D 2270-04.

In one embodiment, the base oil has a low cloud point, such as less than 0° C., and in other embodiments the cloud point is less than −10 C, less than −20° C., less than −30° C., less than −40° C., less than −50° C., or less than −60° C. The test method for determining cloud point is ASTM D 5773-10 Standard Test Method for Cloud Point of Petroleum Products (Constant Cooling Rate Method), or any other method that gives equivalent results.

In one embodiment, the base oil has low pour point, such as less than 0° C., and in certain embodiments the pour point is less than −10° C., less than −20° C., less than −30° C., less than −40° C., less than −50° C., or less than −60° C. Pour point is determined by ASTM D5950-02 (2007) Standard Test Method for Pour Point of Petroleum Products (Automatic Tilt Method). In one embodiment, the low pour point is achieved even when the base oil is not dewaxed. Typical methods for dewaxing are solvent dewaxing and hydroisomerization dewaxing, both of which are well known in the art.

In one embodiment, the initial boiling point of the base oil is 650° F. (343° C.) or less. In another embodiment the initial boiling point of the base oil is from 650° F. (343° C.) to 700° F. (371° C.). In one embodiment, the base oil predominantly boils in the range from 482° C. (900° F.) to 815.6° C. (1500° F.). Predominantly, in the context of this disclosure, is meant to be greater than 50 wt %. In some embodiments at least 80 wt %, up to 100 wt %, of the base oil boils in the range from 482° C. (900° F.) to 815.6° C. (1500° F.). In other embodiments the boiling range of the base oil is up to an upper limit of 749° C.– (1380° F.–), 760° C.– (1400° F.–), or 788° C.– (1450° F.–). It is sometimes desired to have a broad range of boiling points as then the base oil can be distilled into different cuts having different kinematic viscosities, some of which are higher or lower than the kinematic viscosity at 40° C. of the base oil. In one embodiment, the base oil has an upper boiling point greater than 735° C. (1355° F.).

In one embodiment, the one or more olefins having a boiling point less than 82° C. comprise greater than 50 wt % of a total mixture of olefins fed to the reactor. In other embodiments, the one or more olefins having a boiling point less than 82° C. comprise greater than 20 wt %, greater than 30 wt %, greater than 40 wt %, at least 50 wt %, at least 60 wt %, at least 70 wt %, at least 80 wt %, or up to 95 wt % of the total mixture of olefins fed to the reactor.

In one embodiment, a mixture of liquid hydrocarbons fed to the reactor can comprise a mixture of various hydrocarbons, including the one or more olefins having a boiling point less than 82° C., the one or more C5+ alpha olefins, and additionally can comprise one or more isoparaffins or other olefins, and other hydrocarbons that function as diluents.

In one embodiment, the one or more C5+ alpha olefins are present in the reactor in an amount to increase the VI of the base oil. For example, the amount of one or more C5+ alpha olefins can be present at less than 50 wt %, less than 40 wt %, less than 30 wt %, or less than 20 wt % of the total mixture of olefins fed to the reactor. The amount of C5+ alpha olefins will generally be greater than 1 wt % of the mixture of liquid reactants in the reactor. In some embodiments, the VI of the base oil is increased, and the cloud point is not increased, by the presence of C5+ alpha olefins in the reactor.

In one embodiment, the process for increasing the VI of a base oil comprises co-feeding: a mixture of olefins comprising: 1) one or more C5+ alpha olefins (in an amount to increase the VI of the base oil by at least 10, by at least 15, or by at least 20) and 2) one or more olefins having a boiling point less than 82° C. In this embodiment, the base oil can have a kinematic viscosity at 100° C. of 20 mm²/s or higher. In one embodiment, the base oil has both a high kinematic viscosity and a high VI, such as a kinematic viscosity at 100° C. of 36 mm²/s or higher and a VI greater than 55.

C5+ alpha olefins are olefins comprising 5 or more carbon atoms. In one embodiment the C5+ alpha olefins comprise C8+ alpha olefins. C8+ alpha olefins are olefins comprising eight or more carbon atoms. Alpha olefins have a double bond between the first and second carbons in the molecule. In one embodiment, the one or more C8+ alpha olefins comprise 1-decene, 1-dodecene, or a mixture thereof. Examples of C8+ alpha olefins are 1-octene, 1-decene, 1-dodecene, 1-tetradecene, 1-hexadecene, 1-octadecene, and C20+ or C24+ alpha olefins.

The alpha olefins can have either even number, odd number, or a mixture of even and odd numbers of carbon atoms. The alpha olefins can be linear or branched.

Various processes for making alpha olefins are described in "Alpha Olefins", M. Morgan, PERP Report 02/03-4, Nexant Chem Systems, January 2004. Examples of processes for making C5+ alpha olefins are ethylene polymerization, thermal cracking of heavier hydrocarbons, pyrolysis of waste plastic, Fischer-Tropsch processes, metathesis of fatty acids, catalytic cracking of heavier hydrocarbons, and combinations thereof. In one embodiment, the C5+ alpha olefins are produced by the conversion of tertiary alcohols over a zeolite catalyst. One process to do this is described in U.S. Pat. No. 5,157,192. In one embodiment the C5+ alpha olefins are derived from the pyrolysis of a waste plastic, such as polyethylene. Processes for the thermal cracking of Fischer-Tropsch derived waxy feeds to produce olefins are taught in U.S. Pat. Nos. 6,497,812 and 6,703,535. Processes for the pyrolysis of waste plastic are taught in U.S. Pat. Nos. 6,774,272 and 6,822,126. In one embodiment, the C5+ alpha olefins are cut from a high purity Normal Alpha Olefin (NAO) process made by ethylene oligomerization. Very high (99%+) purity C5+ or C8+ alpha olefins can be produced using a modified Ziegler ethylene chain growth technology, for example.

In one embodiment, the oligomerizing in the presence of the one or more C5+ alpha olefins reduces a pour point of the base oil more than a similar process done in the absence of the one or more C5+ alpha olefins. In one embodiment the pour point is at least 5 degrees, or at least 10° C., lower than the pour point of a base oil made by a similar process done in the absence of the one or more C5+ alpha olefins.

In one embodiment, the oligomerizing conditions include temperatures between the melting point of the ionic liquid catalyst and its decomposition temperature. In one embodiment, the oligomerization conditions include a temperature of from about −10° C. to about 150° C., such as from about 0 to about 100° C., from about 10 to about 100° C., from about 0 to about 50° C., from about 40° C. to 60° C., or at around 50° C.

In one embodiment, the oligomerizing occurs in less than 5 hours, and in some embodiments can occur in less than 2 hours, or less than 1 hour. In one embodiment the oligomerizing occurs between 0.1 minutes and 60 minutes, between 10 minutes and 45 minutes, or between 15 minutes and 30 minutes.

In one embodiment, the oligomerizing conditions include an LHSV of the one or more olefins (either the one or more olefins having a boiling point less than 82° C. or the one or more C5+ olefins) from 0.1 to 10, from 0.5 to 5, from 1 to 5, from 1 to 2.5, or from 1 to 1.5.

In one embodiment, the oligomerizing conditions include a molar ratio of the one or more olefins to a halide containing additive of greater than 50, greater than 100, greater than 200, greater than 300, or greater than 400. US Patent Publication No. 20100065476A1 teaches how adjusting and maintaining a high molar ratio of olefin to halide containing additive increases the production of C10+ products.

The oligomerizing is conducted in any reactor that is suitable for the purpose of oligomerizing the one or more olefins in the presence of an ionic liquid catalyst to make the base oil. The oligomerizing can be conducted in a single step or in multiple steps. Examples of reactors that can be used are continuously stirred tank reactors (CTSR), nozzle reactors (including nozzle loop reactors), tubular reactors (including continuous tubular reactors), fixed bed reactors (including fixed bed contactor reactors), and loop reactors (including static mixer loop reactors). Fixed bed contactor reactors are described in patent application Ser. No. 12/824,893, filed Jun. 28, 2010. One embodiment of a fixed bed contactor reactor is shown in FIG. 2.

Static mixer loop reactors use a static mixer placed in a loop in which part of an effluent of the static mixer is recycled to an inlet of the static mixer. Static mixer loop reactors achieve agitation and mixing of the one or more olefins and the ionic liquid catalyst by pumping the one or more olefins and the ionic liquid catalyst through a static mixer in a loop. The static mixer loop reactor behaves kinetically much like a CTSR reactor, but as conversion rates increase, the behavior of the reactor changes to behave more like a plug flow reactor with effluent recycle. The shear mixer loop reactor is easily built in a small volume layout that allows for operation under pressure even in small laboratory units. The contact efficiency can be changed by changing the pressure drop over the static mixer. In one embodiment, a single pass through the static mixer is sufficient to achieve near quantitative conversion of the one or more olefins. In one embodiment, the recycle of the effluent increases the heat capacity and enables more efficient control of an exotherm from the oligomerizing. One embodiment of a static mixer loop reactor is shown in FIG. 1.

The process can be continuous, semi-continuous, or batch. By continuous is meant a process that operates (or is intended to operate) without interruption or cessation. For example a continuous process would be one where the reactants (such as the one or more olefins or the ionic liquid catalyst) are continually introduced into one or more reactors and the base oil is continually withdrawn. By semi-continuous is meant a system that operates (or is intended to operate) with periodic interruption. For example a semi-continuous process to produce a base oil would be one where the reactants are continually introduced into one or more reactors and the base oil product is intermittently withdrawn. A batch process is one that is not continuous or semi-continuous.

In one embodiment, the process entails splitting the one or more olefins into more than one feed stream for feeding into a reactor comprising the ionic liquid catalyst at different locations. One process for doing this is described in US Patent Publication US20090171134.

In one embodiment, the process employs a nozzle dispersion whereby the one or more olefins and the ionic liquid catalyst are injected through at least one nozzle into a reactor to effect the oligomerizing step. In this embodiment, the at least one nozzle provides intimate contact between the one or more olefins and the ionic liquid catalyst for greater product and oligomerizing control. One process for doing this is described in US Patent Publication US20090166257.

In one embodiment, a fresh ionic liquid catalyst is added continuously to the reactor and a passivated ionic liquid catalyst is withdrawn continuously from the reactor. The ionic liquid catalyst can be passivated, for example, by lowering its acidity. This can happen, for example, by complexing with conjunct polymers that form as a byproduct during the oligomerizing. By continuously adding fresh ionic liquid catalyst to the reactor the catalyst activity can be controlled. The passivated ionic liquid catalyst can be regenerated in full or in part, and recycled back to the reactor.

In one embodiment, such as when a fixed bed contactor is used, the ionic liquid catalyst is in the reactor with a solid support. In this embodiment, it is possible for the average residence time for the ionic liquid catalyst in the reactor to be different than the average residence time for the one or more olefins in the reactor.

In one embodiment, the ionic liquid catalyst and the one or more olefins do not form an emulsion. One technical advantage of this embodiment of the process can thus be that the phase separation of the ionic liquid catalyst from the base oil is significantly less difficult; requiring less equipment, having reduced process complexity, requiring less time, or combinations thereof.

In one embodiment, there is a difference between a flow of a hydrocarbon feed comprising the one or more olefins and a flow of the ionic liquid catalyst into a reactor. In one embodiment, for example, the ratio of the flow of the hydrocarbon feed to the flow of the ionic liquid catalyst into a fixed bed contactor reactor can be from about 10:1 to about 1000:1; from about 50:1 to about 300:1; or from about 100:1 to about 200:1, by volume, when the one or more olefins constitute 20-25 wt % of the hydrocarbon feed. In some embodiments, a flow of the ionic liquid catalyst during an introducing of the ionic liquid catalyst to a reactor and a flow of a feed stream comprising the one or more olefins can be varied independently to optimize the process.

In one embodiment a reactor used for the oligomerizing is operated adiabatically. During an adiabatic process, any temperature changes are due to internal system fluctuations, and there is no externally supplied heating or cooling. Operating in this mode can provide significant equipment savings and reductions in process complexity. One way that temperature in the reactor can be maintained in a suitable range is by having a volatile hydrocarbon from a reaction zone in the reactor evaporate to cool the reactor. By having a volatile hydrocarbon from the reaction zone evaporate to cool the reactor the temperature in the reactor can be maintained within 10° C., within 5° C., or within 1° C. In one embodiment, a volatile hydrocarbon from the reaction zone in the reactor evaporates to cool the reactor and the reactor is maintained at a temperature from 25 to 100° C., such as 30 to 70° C., 35 to 50° C., 35 to 40° C., or about 40 to 50° C. This means of cooling the reactor can be highly scalable, and can be used on any reactor size from a small micro-unit reactor in a research lab, to a reactor in a pilot plant, and up to a full size reactor in a large refinery operation. Examples of volatile hydrocarbons from the reaction zone that can provide cooling include $C_6^-$ normal alkanes, isoparaffins, and olefins having a boiling point less than about 15° C. Specific examples are ethylene, ethane, propane, n-butane, isobutane, isobutene, and mixtures thereof.

In one embodiment, a wt % yield of products boiling at 482° C.+ (900° F.+) is greater than 25 wt % of a total yield of products from the oligomerizing step. In some embodiments, the wt % yield of products boiling at 482° C.+ (900° F.+) is at least 35 wt %, at least 45 wt %, at least 50 wt %, at least 65 wt %, or greater than 70 wt %, of a total yield of products from the oligomerizing step.

The base oil can be used in any application where a bright stock or other high viscosity synthetic lubricant can be used. The base oil can be used, for example, to replace one or more thickeners used in formulating other products. Examples of thickeners are polyisobutylenes, high molecular weight complex esters, butyl rubbers, olefin copolymers, styrene-diene polymers, polymethacrylates, styrene-esters, and ultra high viscosity PAOs. Examples of high molecular weight complex esters that can be used as thickeners are the products trademarked by Croda International PLC, such as Priolube® 1847, 1851, 1929, 2040, 2046, 3952, 3955, and 3986. As used in this disclosure, an "ultra high viscosity PAO" has a kinematic viscosity between about 150 and 1,000 mm²/s or higher at 100° C.

The base oil can be blended into a finished lubricant. Examples of finished lubricants are: sugar milling lubricants, gear oils, transmission fluids, chain oils, greases, hydraulic fluids, metalworking fluids, aluminum rolling oils, and engine oils (including two-stroke and four-stroke engine oils). The base oil can be used for gear oils used in heavily loaded, low speed gears where boundary lubrication conditions often prevail, such as in worm gears. In one embodiment, the base oil is blended with one or more other base oils to make a base oil blend having an improved property selected from the group consisting of increased bearing film strength, reduced scuffing wear, reduced oil consumption, and combinations thereof. One method for measuring increased bearing film strength is the ASTM D2670-95 (2010) Standard Test Method for Measuring Wear Properties of Fluid Lubricants (Falex Pin and Vee Block Method). One method for measuring reduced scuffing wear is the ASTM D5182-97 (2008) Standard Test Method for Evaluating the Scuffing Load Capacity of Oils (FZG Visual Method). One method for measuring reduced oil consumption is ASTM D6750-10a Standard Test Methods for Evaluation of Engine Oils in a High-Speed, Single-Cylinder Diesel Engine—1K Procedure (0.4% Fuel Sulfur) and 1N Procedure (0.04% Fuel Sulfur).

The base oil can also be blended with an emulsifier so that it provides both thickening and emulsifying properties to a finished lubricant that is blended with it.

EXAMPLES

Example 1

Comparative

A mixture of 73 wt % propylene and 27 wt % propane from a refinery was introduced into an autoclave containing 1-butylpyridinium heptachloroaluminate ionic liquid under conditions to produce oligomerization of the propylene. The mixture was allowed to stir in the autoclave until there was no decrease in the pressure of the gaseous mixture. The oligomerization was done at zero ° C. and the temperature rise was controlled by cooling. Oligomerization of the propylene in the ionic liquid produced 55-60 wt % heavy oils having a kinematic viscosity of 65 mm$^2$/s at 100° C., a kinematic viscosity of greater than 3100 mm$^2$/s at 40° C., a cloud point of less than −60° C., and a pour point of +4° C. The pour point was not related to wax formation in the oil at low temperature, but is believed to be due to its very high kinematic viscosity. The heavy oil had a VI of 40.

Example 2

A mixture of 77 wt % propylene and 23 wt % propane from a refinery was introduced into an autoclave containing 1-butylpyridinium heptachloroaluminate ionic liquid and about 10 mol % of C10 and C12 alpha olefins (approximately 20 wt % combined C10 and C12 olefins) under conditions to produce oligomerization of the propylene. The mixture was allowed to stir in the autoclave until there was no decrease in the pressure of the gaseous mixture. The oligomerization was done at zero ° C. and the temperature rise was controlled by cooling. Oligomerization of the propylene in the ionic liquid in the presence of the C10 and C12 olefins resulted in a heavy oil with a boiling range of 410 to 1360° F. This heavy oil was hydrotreated and fractionated into two fractions: (900° F.+) 900-1360° F. at 61 wt % yield, and (900° F.−) 410-900° F. at 49 wt % yield. The 900° F.+ fraction had a kinematic viscosity of 42 mm$^2$/s at 100° C., a kinematic viscosity of 1010 mm$^2$/s at 40° C., a VI of 76, a cloud point of less than −60° C., and a pour point of −14° C. The 900° F.− fraction had a kinematic viscosity of 4 mm$^2$/s at 100° C., a kinematic viscosity of 22 mm$^2$/s at 40° C., a VI of 75, a cloud point of less than −60° C., and a pour point of −56° C. The VI was significantly improved by the presence of longer chain alpha olefins during the oligomerization of propylene. The kinematic viscosity of the 900° F.+ fraction maintained a kinematic viscosity at 40° C. of 300 mm$^2$/s or higher.

Example 3

A mixture of propylene, n-butane, and 19 wt % dodecene was introduced into a fixed bed contactor reactor containing 1-butylpyridinium heptachloroaluminate ionic liquid, under conditions to produce oligomerization of the propylene. The fixed bed contactor reactor is described in U.S. patent application Ser. No. 12/824,893, filed Jun. 28, 2010. The oligomerization was done in a single step under the following conditions: olefin LHSV of from 1 to 1.5 (calculated based on the empty contactor reactor), olefin/HCl molar ratio of about 500, temperature about 40-45° C., and greater than 90 wt % olefin conversion. The fixed bed contactor reactor required no agitation. The fixed bed contactor had no internal heat-transfer surface, and the temperature was adiabatically controlled by evaporation of the butane. One advantage of the fixed bed contactor reactor was that the flow of the ionic liquid was independent of the flow of the other reactants in the reactor. Oligomerization of the propylene and dodecene in the ionic liquid produced a heavy oil having a kinematic viscosity at 100° C. of 24 mm$^2$/s and a VI of 87. The heavy oil was hydrotreated and fractionated into three fractions, 65 wt % boiling at 930° F. and higher, 27 wt % boiling from 680 to 930° F., and 7 wt % boiling at less than 680° F. The properties of the fraction boiling at 930° F. and higher were: kinematic viscosity at 100° C. of 57 mm$^2$/s, VI of 78, kinematic viscosity at 40° C. of at least 1614 mm$^2$/s, and cloud point less than −60° C. By including the dodecene in the reactor, the VI of the fraction boiling at 930° F. and higher was increased by at least 15.

Example 4

A mixture of propylene, n-butane, and 19 wt % 1-octene was introduced into the same fixed bed contactor reactor described in Example 3 containing 1-butylpyridinium heptachloroaluminate ionic liquid, under conditions to produce oligomerization of the propylene. The oligomerization was done in a single step under the following conditions: olefin LHSV of 1 to 1.5 (calculated based on the empty contactor reactor), olefin/HCl molar ratio about 500, temperature about 40-45° C., and greater than 90 wt % olefin conversion. Oligomerization of the propylene and the 1-octene in the ionic liquid produced a heavy oil having a kinematic viscosity at 100° C. of 29 mm$^2$/s and a VI of 82. The heavy oil was hydrotreated and fractionated into three fractions, 67 wt % boiling at 930° F. and higher (greater than 70 wt % boiling at 900° F. and higher), 27 wt % boiling from 680 to 930° F., and 6 wt % boiling at less than 680° F. The properties of the fraction boiling at 930° F. and higher were: kinematic viscosity at 100° C. of 69 mm$^2$/s, VI of 75, and kinematic viscosity at 40° C. of at least 2336.

Example 5

A mixture of 77 wt % propylene and 23 wt % propane from a refinery was introduced into an autoclave containing 1-butylpyridinium heptachloroaluminate ionic liquid and about 15 mol % of C10 alpha olefins (approximately 28 wt % combined C10 and C12 olefins) under conditions to produce oligomerization of the propylene. The mixture was allowed to stir in the autoclave until there was no decrease in the pressure of the gaseous mixture. The oligomerization was done at zero ° C. and the temperature rise was controlled by cooling. Oligomerization of the propylene in the ionic liquid in the presence of the C10 and C12 olefins resulted in a heavy oil with a boiling range of 410 to 1360° F. This heavy oil was hydrotreated and fractionated into two fractions: (900° F.+) 900-1360° F. at 65 wt % yield, and (900° F.−) 410-900° F. at 45 wt % yield. The 900° F.+ fraction had a kinematic viscosity of 36 mm$^2$/s at 100° C., a kinematic viscosity of 711 mm$^2$/s at 40° C., a VI of 81, a cloud point of less than −60° C., and a pour point of −16° C. The 900° F.− fraction had a kinematic viscosity of 4.5 mm$^2$/s at 100° C., a kinematic viscosity of 25 mm$^2$/s at 40° C., a VI of 80, a cloud point of less than −60° C., and a pour point of −52° C. The VI was significantly improved by the presence of longer chain alpha olefins during the oligomerization of propylene. The kinematic viscosity of the 900° F.+ fraction maintained a kinematic viscosity at 40° C. of 300 mm$^2$/s or higher.

Example 6

A mixture of 77 wt % propylene and 23 wt % propane from a refinery was introduced into an autoclave containing 1-butylpyridinium heptachloroaluminate ionic liquid and approximately 30 wt % of alpha olefins derived from waste plastics by pyrolysis. The waste plastics alpha olefins were comprised of various alpha olefins that fell in the boiling range of 140-310° F. (mostly C5 to C10 olefins and 3.4% aromatics (mostly naphthalene or derivatives). The reaction was run as described in Example 5. The mixture was allowed to stir in the autoclave until there was no decrease in the pressure of the gaseous mixture (indication of near complete propylene consumption). The oligomerization produced an oligomer in the boiling range of 330-1360° F. The oligomerization product was hydrotreated and fractionated into two fractions: 900° F.+ (482° C.+) at 49 wt % yield, and (900° F.−) 410-900° F. at 51 wt % yield. The 900° F.+ fraction had a kinematic viscosity of 70.6 mm$^2$/s at 100° C., a kinematic viscosity of 1608 mm$^2$/s at 40° C., a VI of 90, a cloud point of less than −60° C., and a pour point of −2° C. The VI was significantly improved by the presence of alpha olefins derived by pyrolysis of waste plastics and the kinematic viscosity of the 900° F.+ fraction maintained a kinematic viscosity at 40° C. of greater than 300 mm$^2$/s.

The term "comprising" means including the elements or steps that are identified following that term, but any such elements or steps are not exhaustive, and an embodiment can include other elements or steps. For the purposes of this specification and appended claims, unless otherwise indicated, all numbers expressing quantities, percentages or proportions, and other numerical values used in the specification and claims, are to be understood as being modified in all instances by the term "about". Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a", "an", and "the", include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible sub-generic combinations of the listed components and mixtures thereof.

What is claimed is:

1. A process for producing base oil, comprising oligomerizing one or more olefins having a boiling point less than 82° C. (180° F.) in a presence of an ionic liquid catalyst and one or more C8+ alpha olefins in a reactor to produce a base oil having a kinematic viscosity at 100° C. of 36 mm$^2$/s or higher and a viscosity index (VI) greater than 55; wherein:
   a. the ionic liquid catalyst is an alkyl substituted pyridinium chloroaluminate or an alkyl substituted imidazolium chloroaluminate of the general formulas A and B, respectively:

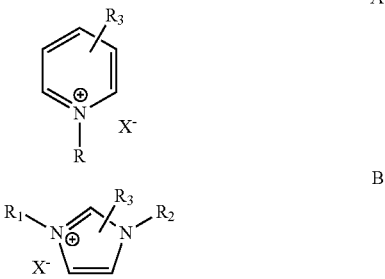

where R, R$_1$, R$_2$, and R$_3$ are methyl, ethyl, propyl, butyl, pentyl or hexyl, and X is a chloroaluminate; and the one or more olefins having the boiling point less than 82° C. (180° F.) comprise greater than 50 wt % of a total mixture of olefins fed to the reactor.

2. The process of claim 1, wherein the kinematic viscosity at 100° C. is greater than 40 mm$^2$/s.

3. The process of claim 1, wherein the kinematic viscosity at 100° C. is 45 mm$^2$/s or higher.

4. The process of claim 1, wherein the base oil has a kinematic viscosity at 40° C. of 300 mm$^2$/s or higher.

5. The process of claim 4, wherein the kinematic viscosity at 40° C. is greater than 1100 mm$^2$/s.

6. The process of claim 1, wherein the base oil has a cloud point less than −20° C.

7. The process of claim 6, wherein the cloud point is less than −30° C.

8. The process of claim 1, wherein the base oil has a pour point less than −10° C.

9. The process of claim 8, wherein the base oil is not dewaxed.

10. The process of claim 1, wherein at least 80 wt % of the base oil boils within a range from 482° C. (900° F.) to 815.6° C. (1500° F.).

11. The process of claim 1, wherein the one or more C8+ alpha olefins comprise less than 40 wt % of the total mixture of olefins fed to the reactor.

12. The process of claim 1, wherein the one or more olefins having the boiling point less than 82° C. (180° F.) comprise at least 60 wt % of the total mixture of olefins fed to the reactor.

13. The process of claim 12, wherein the one or more olefins having the boiling point less than 82° C. (180° F.) comprise at least 70 wt % of the total mixture of olefins fed to the reactor.

14. The process of claim 1, wherein the oligomerizing is completed in a single step.

15. The process of claim 1, wherein the one or more olefins having the boiling point less than 82° C. (180° F.) comprise propylene, a butene, or a mixture thereof.

16. The process of claim 1, wherein the viscosity index (VI) is at least 80.

17. The process of claim 16, wherein the viscosity index (VI) is at least 90.

18. The process of claim 1, wherein the one or more C8+ alpha olefins comprise 1-decene, 1-dodecene, or a mixture thereof.

19. The process of claim 1, wherein a yield of products boiling at 482° C.+ (900° F.+) is greater than 70 wt % from the oligomerizing.

20. The process of claim 1, wherein the one or more C8+ alpha olefins are made by ethylene polymerization, thermal cracking of heavier hydrocarbons, pyrolysis of waste plastic, Fischer-Tropsch processes, metathesis of fatty acids, catalytic cracking of heavier hydrocarbons, or combinations thereof.

21. The process of claim 1, wherein the oligomerizing is conducted in a fixed bed contactor reactor.

22. The process of claim 1, wherein the oligomerizing is conducted in a static mixer loop reactor.

23. A process to make base oil, comprising oligomerizing one or more olefins having a boiling point less than 82° C. (180° F.) in a presence of an ionic liquid catalyst and a mixture of C8+ alpha olefins derived from waste plastic to produce a base oil having a kinematic viscosity at 40° C. greater than 1100 mm$^2$/s and a viscosity index (VI) greater than 55; wherein the ionic liquid catalyst is an alkyl substituted pyridinium chloroaluminate or an alkyl substituted imidazolium chloroaluminate of the general formulas A and B, respectively:

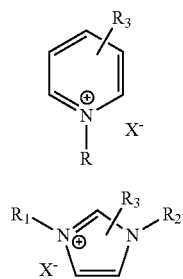

where R, $R_1$, $R_2$, and $R_3$ are methyl, ethyl, propyl, butyl, pentyl or hexyl, and X is a chloroaluminate.

24. The process of claim 23, wherein the viscosity index (VI) is at least 80.

25. The process of claim 23, wherein the viscosity index (VI) is at least 90.

26. A base oil, comprising one or more oligomers of a mixture of olefins, wherein the mixture of olefins comprises propylene and one or more C5+ olefins derived from waste plastic; wherein the base oil has a kinematic viscosity at 40° C. greater than 1100 mm$^2$/s, and a viscosity index (VI) of at least 70; and wherein the ionic liquid catalyst is an alkyl substituted pyridinium chloroaluminate or an alkyl substituted imidazolium chloroaluminate of the general formulas A and B, respectively:

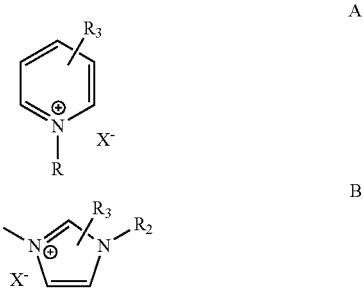

where R, $R_1$, $R_2$, and $R_3$ are methyl, ethyl, propyl, butyl, pentyl, or hexyl and X is a chloroaluminate.

27. The process of claim 23, wherein the kinematic viscosity at 40° C. is 1200 mm$^2$/s or higher.

28. The base oil of claim 26, wherein the kinematic viscosity at 40° C. is 1200 mm$^2$/s or higher.

* * * * *